No. 712,293. Patented Oct. 28, 1902.
J. H. GENTER.
PIVOTED HUB.
(Application filed Dec. 3, 1901.)
(No Model.)
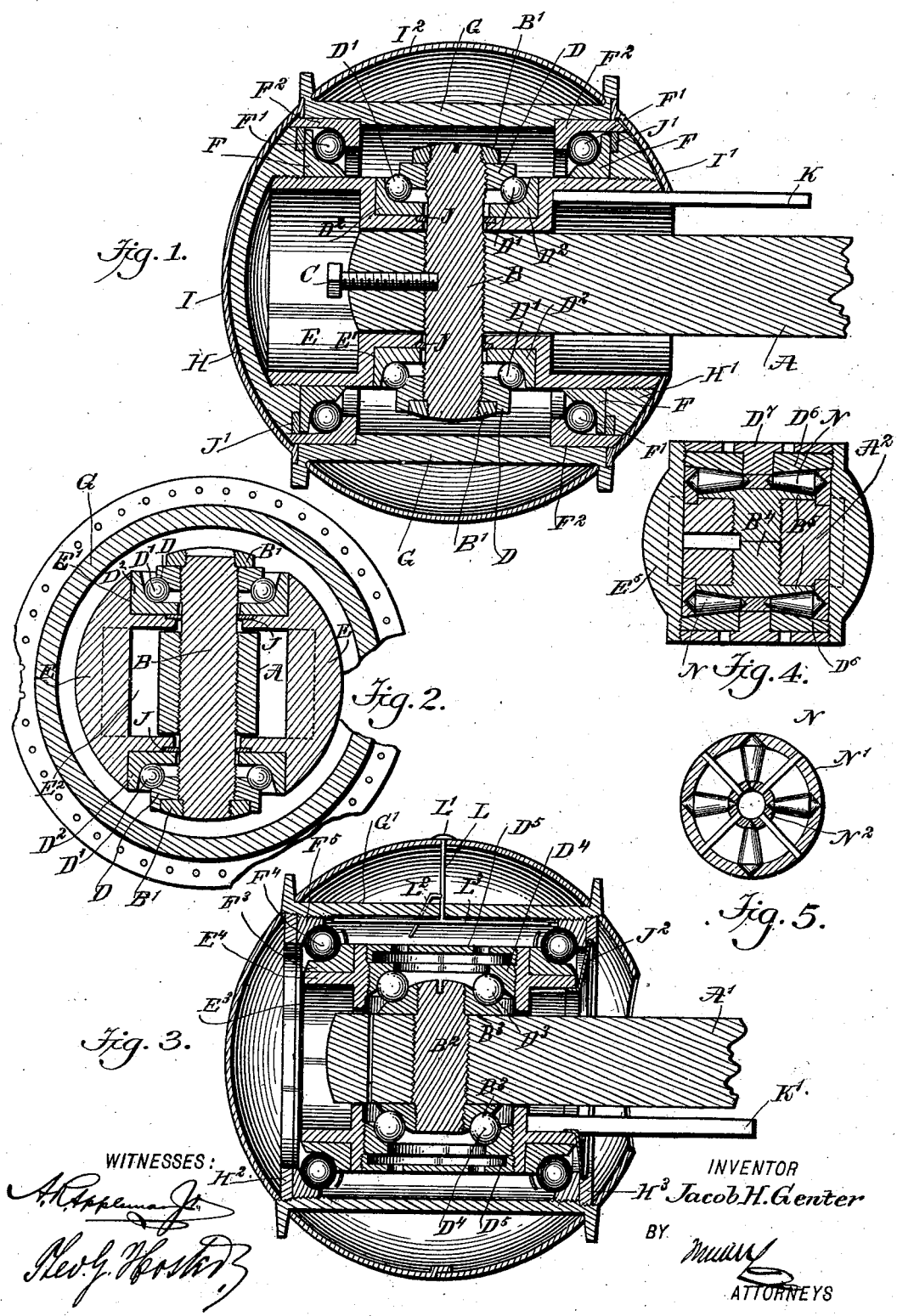
WITNESSES:
INVENTOR
Jacob H. Genter
BY
ATTORNEYS

UNITED STATES PATENT OFFICE.

JACOB H. GENTER, OF ALBANY, NEW YORK.

PIVOTED HUB.

SPECIFICATION forming part of Letters Patent No. 712,293, dated October 28, 1902.

Application filed December 3, 1901. Serial No. 84,501. (No model.)

*To all whom it may concern:*

Be it known that I, JACOB H. GENTER, a citizen of the United States, and a resident of Albany, in the county of Albany and State of New York, have invented a new and Improved Pivoted Hub, of which the following is a full, clear, and exact description.

The invention relates to road-vehicles having a steering-gear for the front wheels.

The object of the invention is to provide a new and improved pivoted hub which is simple and durable in construction, arranged to reduce the friction of the working parts to a minimum, and more especially designed for the front or steering wheel of a road-vehicle, to permit convenient and quick turning of the wheel in the desired direction for steering the vehicle properly, and facilitating adjusting of the various parts, producing proper lubrication and rendering the device entirely dustproof.

The invention consists of novel features and parts and combinations of the same, as will be fully described hereinafter and then pointed out in the claims.

A practical embodiment of the invention is represented in the accompanying drawings, forming a part of this specification, in which similar characters of reference indicate corresponding parts in all the views.

Figure 1 is a sectional side elevation of the improvement. Fig. 2 is a cross-section of the bearing for the hub. Fig. 3 is a sectional side elevation of a modified form of the improvement. Fig. 4 is a transverse section of a modified form of the improvement, and Fig. 5 is a sectional plan view of the roller-bearing for the modified form shown in Fig. 4.

The front axle A of the vehicle is provided near each outer end with a vertically-disposed pivot B, preferably screwed into the axle A and secured therein by a set-screw C to firmly hold the pivot in position. On the upper and lower ends of the pivot B screw cones D, engaging balls D', mounted in a cup $D^2$, fitted in a recess E', formed in the peripheral surface of a tubular bearing E, having an elongated opening $E^2$ in its middle portion to accommodate the outer end of the axle A. Nuts B' screw on the extreme outer ends of the pivot B to securely hold the cones D in position, it being understood that the said cones D, the sets of balls D', and the cups $D^2$ form a ball-bearing on the exterior periphery of the hub-bearing for the bearing E to turn on in a horizontal direction and that the pivot B extends centrally in the recesses E' containing the ball-bearing. On opposite sides of the recesses E' of the bearing E are arranged cones F, engaging sets of balls F', mounted in cups $F^2$, carried by the hub G of the vehicle-wheel, it being understood that the said cones F, sets of balls F', and cups $F^2$ form ball-bearings interposed between the hub G and the bearing E.

By the arrangement described it will be seen that the hub G revolves on the bearing E, which in turn revolves on the pivot B, the vertical plane of rotation of the wheel extending through the axis of the pivot B, so that when the bearing E is turned the said plane of rotation of the wheel is shifted to cause the vehicle to steer either to the right or left, according to the direction in which the bearing E is turned. The outer cone F is held in place by a nut H in the form of a cap screwing on the outer end of the bearing E, and the inner cone F is held in position by a nut H', screwing on the inner end of the said bearing E. A spherical covering-plate I fits over the nut H free from contact with the same and is attached to the hub G, and a spherical ring I' fits over the inner end of the bearing E, the nut H', and the outer portion of the inner cup $F^2$ and free from contact with the bearing E and nut H', as plainly shown in Fig. 1, the said ring I' being secured to the inside of the hub G. A spherical ring $I^2$ also fits upon the hub G at the middle portion thereof, the said covering I and rings I' and $I^2$ giving a spherical appearance to the hub and at the same time preventing dust from passing to the working parts. Flexible dust-rings J are interposed between the pivot B and the bearing E to prevent dust from passing by way of the axle A to the inside of the pivoted hub. Similar dust-rings J' are interposed between the nut H and the adjacent cone F and between the nut H' and the adjacent inner cone F. A curved bar K is secured to the inside of the bearing E at the inner end thereof, and this bar K forms part of the steering mechanism, under the control of the operator, to turn the bearing E in the desired direction to cause the wheel to travel straight forward or turn to either side, according to the position of the steering-gear.

As illustrated in Fig. 3, the axle A' carries at each end a pivot $B^2$, the nuts $B^3$ of which form cups for balls $D^3$, engaging cones $D^4$, screwed or otherwise fastened in a bearing $E^3$, under the control of the operator, by a bar K' of the steering device. Nuts $D^5$ screw in the bearing $E^3$ at the top and bottom thereof to hold the cones $D^4$ in position. The bearing $E^3$ is also provided at its ends with annular flanges $E^4$, carrying cups $F^3$ for sets of balls $F^4$, engaged by cones $F^5$, screwing in the ends of the hub G' of the vehicle-wheel, the said cones $F^5$ being secured in place by rings $H^2$ and $H^3$, screwing in the outer and inner ends of the hubs G'. A dust-cap $J^2$ is secured to the outer end of the inner annular flange $E^4$ and to the ring $H^3$, so as to close the inner ball-bearing to prevent dust from passing to the inside of the pivoted hub.

In order to properly lubricate this device, I provide a pipe L, extending through the hub G' to the inside thereof, the outer end being normally closed by a suitable cap L'. The pipe L is provided with branch pipes $L^2 L^3$, of which the branch pipe $L^2$ directs oil to the balls $D^3$, cups $B^3$, and cones $D^4$, while the branch pipe $L^3$ directs the lubricant to the balls $F^4$ and their cones and cups.

I do not limit myself to the particular construction of ball-bearings shown and described, as the same may be varied, and roller-bearings, for instance, may be substituted, as shown in Figs. 4 and 5. In this case the axle $A^2$ carries a sectional pivot $B^4$, formed with bearing-surfaces $B^5$ for cone-shaped rollers N, journaled in outer and inner rings N' and $N^2$, fitted in a bearing $E^5$ at the top and bottom thereof. The conical rollers N are engaged by rings $D^6$, screwed in the top and bottom of the bearing $E^5$ and held therein by suitable caps $D^7$, which also have central offsets engaging the inner rings $N^2$ of the roller-bearings. It is understood that by the arrangement described the bearing $E^5$ can be readily turned on the sectional pivot $B^4$ and the friction is reduced to a minimum by the roller-bearings N.

Having thus described my invention, I claim as new and desire to secure by Letters Patent—

1. A pivoted hub, comprising a pivot carried by the axle, a bearing carried by the pivot and on which the hub is mounted to turn, and a casing attached to the hub and inclosing the parts, as set forth.

2. A pivoted hub, comprising a vertically-disposed pivot on the axle, a bearing mounted to turn longitudinally on the said pivot, and on which the hub is mounted to revolve in a vertical plane extending through the axis of the pivot, and a casing inclosing the parts, as set forth.

3. A pivoted hub, comprising a pivot carried by the axle, a bearing carried by the pivot and on which the hub is mounted to turn, means connected with the said bearing to turn the latter on its pivot, and a casing inclosing the parts, as set forth.

4. A pivoted hub, comprising a pivot carried by the axle, a bearing carried by the pivot and on which the hub is mounted to turn, and a spherical casing inclosing the parts, as set forth.

5. A pivoted hub, comprising a pivot carried by the axle, a bearing carried by the pivot and on which the hub is mounted to turn, and a casing inclosing the parts and comprising a covering-plate section secured to the outer end of the hub proper, an inner ring-section surrounding the axle and secured to the inner end of the hub proper, and a ring-section fitting upon the hub proper at the middle portion thereof, as set forth.

6. A pivoted hub, comprising a pivot carried by the axle, a bearing carried by the pivot and on which the hub is mounted to turn, a casing inclosing the parts and comprising a plate-section secured to the outer end of the hub, a ring-section secured to the middle portion of the hub, and a ring-section secured to the inner end of the hub, and a rod or bar connected with the bearing at the inner end thereof and forming part of the steering mechanism, the inner ring-section of the casing surrounding the said rod or bar and the axle, as set forth.

7. A pivoted hub, comprising a vertically-disposed pivot, a hub-bearing, a ball-bearing interposed between the said hub-bearing and the said pivot, a hub, a ball-bearing interposed between the hub-bearing and the hub, means for rendering the said ball-bearing dust-proof, and a spherical casing on the hub and inclosing the parts, as set forth.

8. A pivoted hub, comprising a vertically-disposed pivot, a hub-bearing, a ball-bearing interposed between the said hub-bearing and the said pivot, a hub, a ball-bearing interposed between the hub-bearing and the hub, a spherical casing inclosing the parts, and a lubricating device for conveying the lubricant from the outside of the spherical casing to the parts to be lubricated, as set forth.

9. A pivoted hub, comprising a vertically-disposed pivot on the axle, a hub-bearing mounted to turn longitudinally on the said pivot, a set of adjusting-cones carried by the pivot and lock-nuts thereof, a set of cups carried by the hub-bearing, interposed balls between the pivot and hub-bearing or parts thereof, the whole being mounted on the pivot and hub-bearing, on the outer periphery of the hub-bearing, and on which the hub is mounted to revolve in a vertical plane extending through the axis of the pivot, a hub and ball bearing interposed between the hub-bearing and the hub, and a spherical casing inclosing the parts, as set forth.

10. A pivoted hub, comprising a vertically-disposed pivot on the axle, adapted to receive a set of cups carried by the axle and pivot, a hub-bearing adapted to receive a set of adjusting-cones and lock-nuts thereof in a casing formed in the hub-bearing, interposed balls between the cups and cones or the pivot and bearing on which the hub is mounted to turn longitudinally on the axle by means of the said bearing and on which the hub is mounted to revolve in a vertical plane extending through the axis of the pivot, a hub and a ball bearing interposed between the hub-bearing and the hub, a rod or bar secured to the inside of said hub-bearing and forming part of the steering mechanism to turn the bearing on its pivot, and a covering or casing attached to the hub proper, as set forth.

11. A pivoted hub, comprising a vertically-disposed sectional pivot provided with bearing-surfaces, or a vertically-disposed pivot adapted to receive a bearing-surface at each end acting in the capacity of nuts for pivots, a hub-bearing adapted to receive adjusting-cones and lock-nuts therefor, interposed conical rollers journaled in cages, said rollers being interposed between bearing-surfaces carried by the axle held by the pivot, and a bearing held by the hub-bearing, over which the hub is mounted to revolve by means of an interposed ball-bearing between the hub-bearing and the hub, and means to turn the hub-bearing by connecting a rod to the hub-bearing, an oiling device comprising a normally closed tube extending through the hub proper and connected to a branch pipe leading to the bearings, dust-proof flexible washers surrounding the pivot or bearing parts, and a sectional spherical covering or casing attached to the hub proper, free from contact with the hub-bearing and axle, as set forth.

12. A pivoted hub, comprising a hub proper, a bearing on which the hub is mounted to turn in a vertical plane, a vertical pivot on which the bearing is mounted to turn horizontally, the axis of the pivot extending in the said plane, an axle carrying the said pivot, means on the said bearing for turning the latter horizontally, a ball or roller bearing interposed between the pivot and bearing and a second ball-bearing interposed between the said bearing and the said hub, a lubricating device conveying the oil to the bearing parts, dust-excluders consisting of flexible rings surrounding the bearing parts, and a sectional spherical case attached to the hub proper free from contact with the hub-bearing, and incasing all, as a further preventive of dust entering the bearing parts, as set forth.

13. A pivoted hub, comprising a hub proper, a bearing on which the hub is mounted to turn, a vertical pivot carried by the axle and on which the said bearing is mounted to turn, and a spherical casing formed in sections attached to the hub proper, and inclosing the parts, as set forth.

14. A pivoted hub, comprising a hub proper, a pivot carried by the axle, a hub-bearing mounted to turn on the pivot and on which the hub is mounted to turn, a ball or roller bearing interposed between the pivot and the hub-bearing, a second ball-bearing interposed between the hub-bearing and the hub, and means for lubricating the parts comprising a pipe normally closed at its outer end and extending through the hub to the inside thereof, the said pipe being connected with branch pipes leading to the respective ball or roller bearings, as set forth.

15. A pivoted hub, comprising a hub proper, a tubular bearing on which the hub is mounted to turn in a vertical plane, an axle, a vertical pivot screwing into the axle and on which the hub-bearing is mounted to turn horizontally, the said hub-bearing having an elongated opening in its middle portion to accommodate the outer end of the axle, means connected with the said bearing for turning the latter horizontally, ball or roller bearings between the pivot and the said hub-bearing and mounted in recesses on the outer periphery of the hub-bearing, the said pivot extending centrally in the said recesses, ball-bearings arranged on opposite sides of the said recesses and interposed between the said hub-bearing and the said hub, and means for rendering the ball-bearings dust-proof, and comprising flexible rings surrounding the bearing parts, as set forth.

In testimony whereof I have signed my name to this specification in the presence of two subscribing witnesses.

JACOB H. GENTER.

Witnesses:
  HERMAN J. DIEKMAN,
  THOMAS J. GRAVELINE.